(12) United States Patent
Ford

(10) Patent No.: US 6,272,272 B1
(45) Date of Patent: Aug. 7, 2001

(54) MULTIPLE COLLIMATED-BEAM PHOTONICS PACKAGE

(75) Inventor: Joseph E. Ford, Oakhurst, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/394,328

(22) Filed: Sep. 13, 1999

(51) Int. Cl.[7] ..................................................... G02B 6/26
(52) U.S. Cl. .............................. 385/52; 385/34; 385/89; 385/93
(58) Field of Search .............................. 385/89, 33, 34, 385/52, 59, 49, 50, 51, 61, 65, 71, 74, 83, 88, 93

(56) References Cited

U.S. PATENT DOCUMENTS

| | | | |
|---|---|---|---|
| 5,555,333 | * | 9/1996 | Kato .......................................... 385/89 |
| 5,706,371 | * | 1/1998 | Pan ........................................... 385/11 |
| 5,949,932 | * | 9/1999 | Lawrenz-Stolz ......................... 385/33 |
| 6,178,033 | * | 1/2001 | Ford et al. .............................. 359/247 |

* cited by examiner

Primary Examiner—John D. Lee
Assistant Examiner—Jennifer Doan
(74) Attorney, Agent, or Firm—David L. Davis

(57) ABSTRACT

A collimated-beam photonics package wherein the plurality of optical fibers and imaging devices are held in a parallel spaced array in a first holder and a plurality of surface-normal optic devices are held in a corresponding spaced array in a second holder. The first and second holders have complementary exterior features so that the first and second holders are securable to each other with the respective arrays being registered one with the other.

12 Claims, 5 Drawing Sheets

MULTIPLE COLLIMATED-BEAM PHOTONICS PACKAGE

BACKGROUND OF THE INVENTION

This invention relates to packaging for collimated-beam optical devices and, more particularly, to an improved package for a plurality of such devices wherein ease of alignment is effected.

Many opto-electronic and opto-mechanical devices are packaged with the active element in the collimated-beam plane (i.e., Fourier-plane). This means that light from an input fiber, typically single mode, is collimated by a lens and illuminates a device at a small angle with respect to the surface normal of the device. The device acts upon the light, for example, by attenuating, filtering, tilting, etc. Then the reflected output signal is directed through a lens and focused into a separate output fiber, also typically single mode. It is known to package the input/output fiber pair, lens and device in a single cylindrically shaped package. However, each such package only holds a single device and its associated fibers. Where multiple devices and input/output fibers are utilized, multiple alignments are then required. It would be desirable to provide a package holding multiple devices and input/output fibers which greatly reduces the number of required alignments.

SUMMARY OF THE INVENTION

In accordance with the present invention, there is provided a collimated-beam photonics package comprising a plurality of optical fibers and a plurality of imaging devices. A first holder is arranged to hold end segments of the plurality of optical fibers in a parallel spaced array and to hold the plurality of imaging devices with one or more optical fibers in alignment with each of the plurality of imaging devices. A plurality of surface-normal optic devices are also provided, along with a second holder arranged to hold the plurality of optic devices in a spaced array corresponding to the parallel spaced array of the plurality of optical fibers. The first and second holders can be formed with complementary exterior features so that the first and second holders are securable one to the other with each imaging device in optical communication with a respective optic device.

In accordance with an aspect of this invention, the first holder holds the optical fiber end segments in a linear array.

In accordance with another aspect of this invention, the first holder comprises at least one silicon V-groove array.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
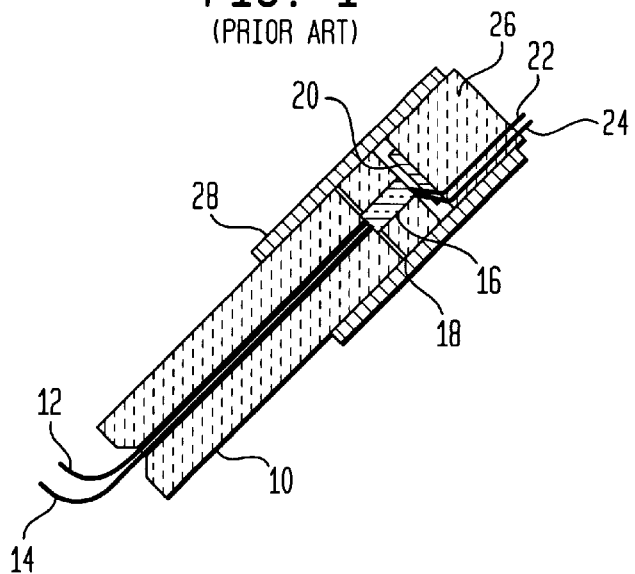
FIG. 1 is a cross sectional view of a prior art cylindrical collimated-beam package for a single optic device.

As shown in FIG. 1, a prior art cylindrical collimated-beam single optic device includes a ceramic ferrule 10 holding an input fiber 12 and an output fiber 14. An imaging device, illustratively a gradient index (GRIN) lens 16 is held within another ceramic ferrule 18. A surface-normal optic device 20, coupled to electrical wires 22, 24, is mounted to a cylindrical ceramic substrate 26. A ceramic sleeve 28 holds the ferrules 10, 18. After the fibers 12, 14, the lens 16 and the device 20 have been actively aligned, the two parts are permanently joined by laser welding.

Figure 2:
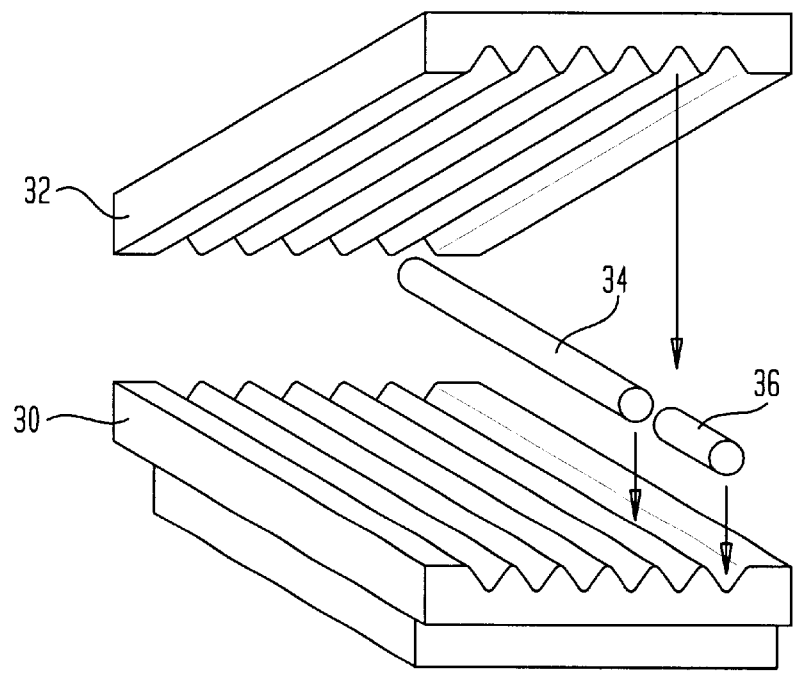
FIG. 2 is an exploded perspective view of a prior art silicon V-groove holder for multiple fibers and lenses.

FIG. 2 illustrates the use of silicon V-groove substrates for holding a plurality of optical fibers in alignment with respective imaging devices. Such a package is manufactured by ACT MicroDevices, Inc., of Radford, Va., and includes a pair of opposed V-groove chips 30, 32 for holding therebetween optical fibers 34 and lenses 36. Although FIG. 2 only illustrates a single optical fiber 34 associated with the lens 36, where multiple fibers are associated with each lens the V-grooves would be configured to have a large groove at one end for accommodating the lens and a plurality of smaller parallel grooves "behind" the large groove for accommodating the plurality of fibers.

The applicant has realized that by utilizing a holder of the type shown in FIG. 2, the number of alignments required for multiple collimated-beam photonics packages is reduced. The advantage of using silicon V-groove alignment for multiple devices is that instead of a single device, a linear array of devices can be used. If the mechanical tolerances are sufficiently tight, then it is only necessary to perform active alignment using one or two devices (e.g., the first and last elements in the array) to obtain alignment of all devices.

Figure 3:
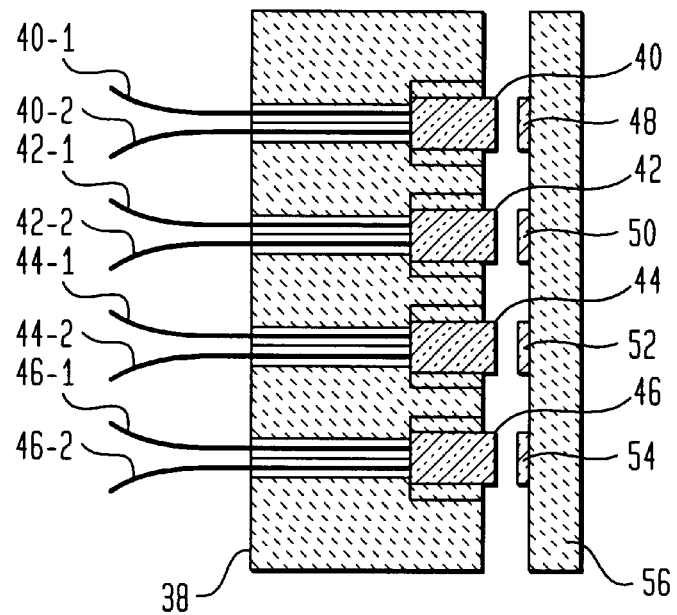
FIG. 3 is a simplified cross sectional view schematically illustrating a first embodiment of a package according to the present invention.
Figure 4:
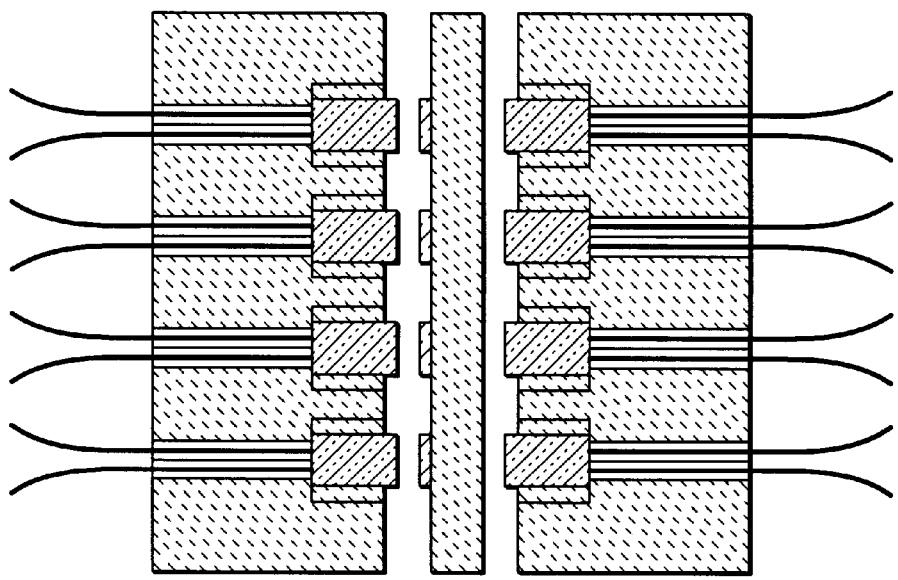
FIG. 4 is a simplified cross sectional view schematically illustrating a second embodiment of a package according to the present invention.

FIG. 3 illustrates this concept. A silicon V-groove chip 38 is shown holding four gradient index lenses 40, 42, 44 and 46, each associated with a respective pair of fibers 40-1, 40-2; 42-1, 42-2; 44-1, 44-2; and 46-1, 46-2. Associated with each of the lenses 40, 42, 44, 46, is a respective optic device 48, 50, 52, 54, each mounted to a silicon chip 56 which is oriented at right angles to the silicon V-groove arrays used to hold the fibers and lenses. An important advantage of this packaging arrangement is that planar microlenses can be held, polished and coated in a linear array. In addition to making it possible to do this on multiple lenses at once, it allows the lenses to be held with a greater accuracy than a single lens could be held, therefore improving fabrication tolerances. Further, by insuring that the lenses 40 and 46 are in respective alignment with the devices 48, 54, this insures that the intermediate lenses and devices are also in alignment. FIG. 3 is illustrative of the use of reflective devices 48, 50, 52, 54. If, instead, transmissive devices are utilized, a packaging arrangement as shown in FIG. 4 would be used. Finally, if the devices are designed to stand at right angles to their substrate, the device substrate can be parallel to (or the same piece as) the V-groove array.

Figure 5:
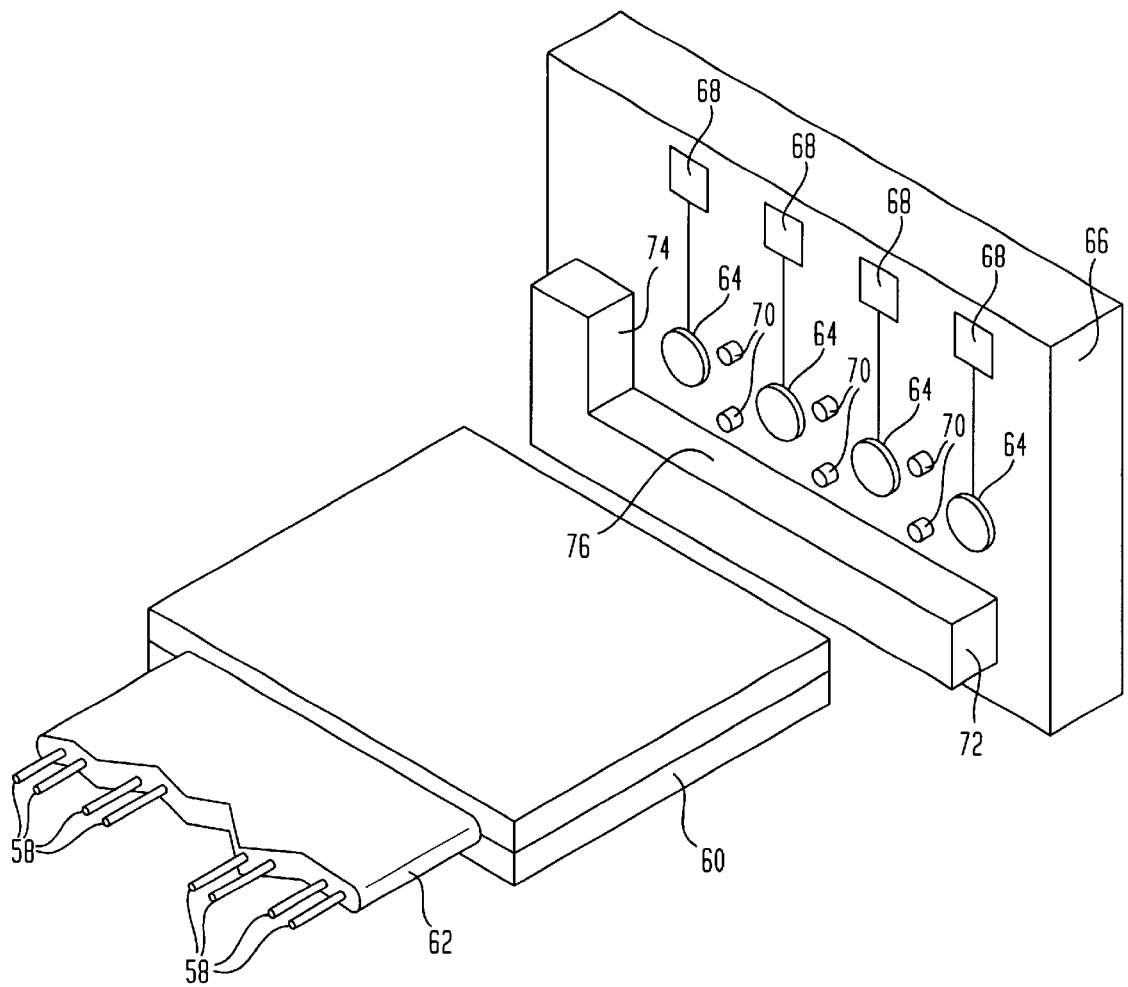
FIG. 5 is a simplified perspective view schematically illustrating an embodiment of first and second holders according to the present invention, showing the complementary exterior features.

FIG. 5 illustrates complementary exterior features on the holders for the fibers and the optic devices which maintains the holders in rough alignment until an active alignment can be effected. Thus, the holder for the fibers 58 and lenses (not shown in FIG. 5) includes a silicon V-groove holder 60, of the type shown in FIG. 2, and provided with strain relief 62 for the fibers 58. For illustrative purposes, there are four sets of fibers and lenses. Accordingly, there are four optic devices 64 mounted to a silicon substrate 66. Electrical contact pads 68 are provided on the substrate 66 for electrical connection to the devices 64. (It is noted that the illustrated number of electrical connections is not intended to be limiting.) The holder 60 is of rectilinear configuration with a planar mating face. The substrate 66 is formed with a plurality of pedestals 70, all of the same height, which height is greater than the height of the optic devices 64. Also part of the substrate 66 is an L-shaped block 72. The block 72 has a greater height than the pedestals 70. Since the holder 60 is rectilinear, the surfaces 74, 76 of the block 72 are configured complemental to lateral surfaces of the holder 60. Thus, the holder 60 can be placed up against the surfaces 74, 76 with its planar front mating face abutting the pedestals 70 so that the lenses are in a predetermined alignment with respective ones of the optic devices 64. Final active alignment can then be made and the holder 60 secured to the substrate 66.

Figure 6A:
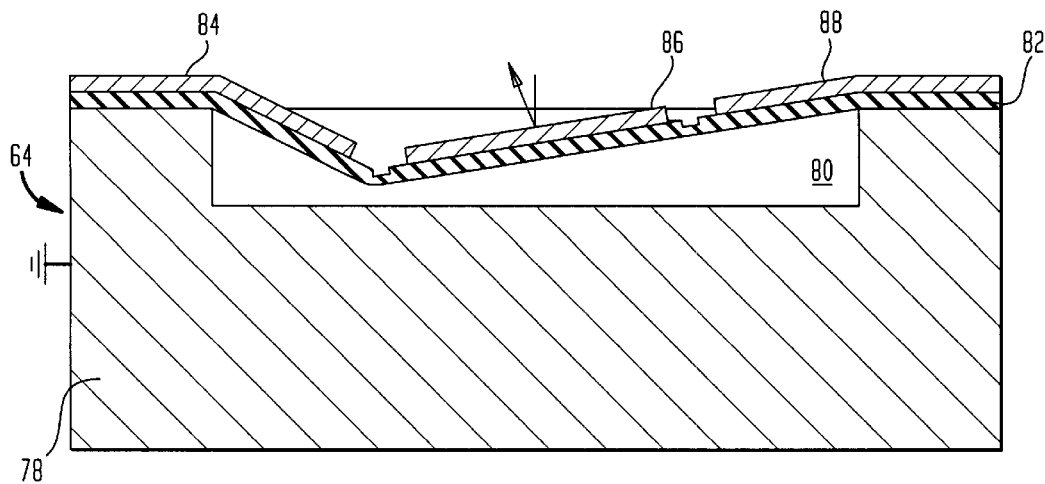
FIGS. 6A and 6B are simplified side and plan views, respectively, of a membrane tilt-mirror switch which may be used as an optic device in the package according to the present invention.
Figure 6B:
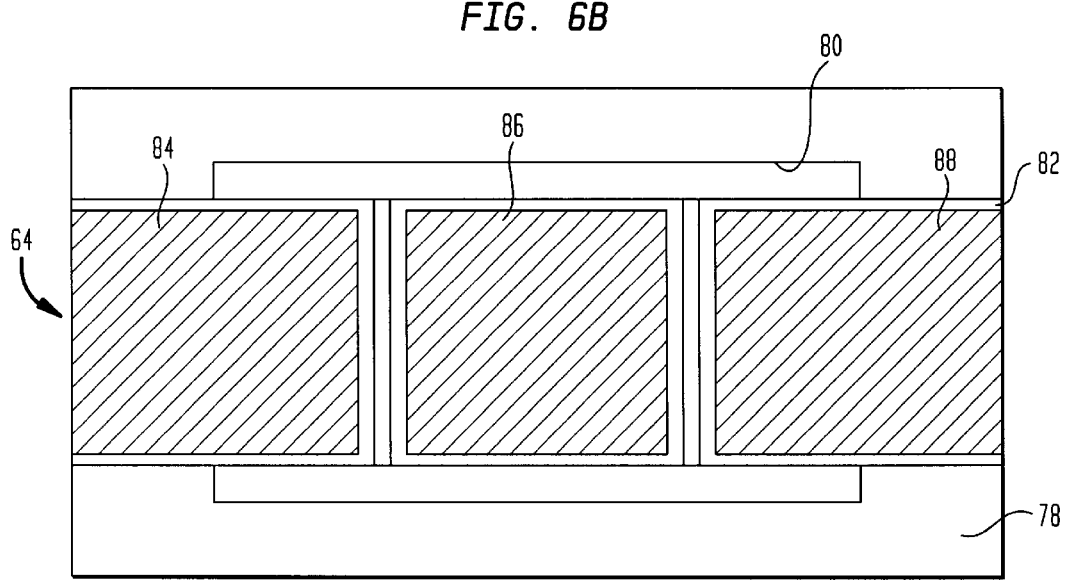
Figure 7:
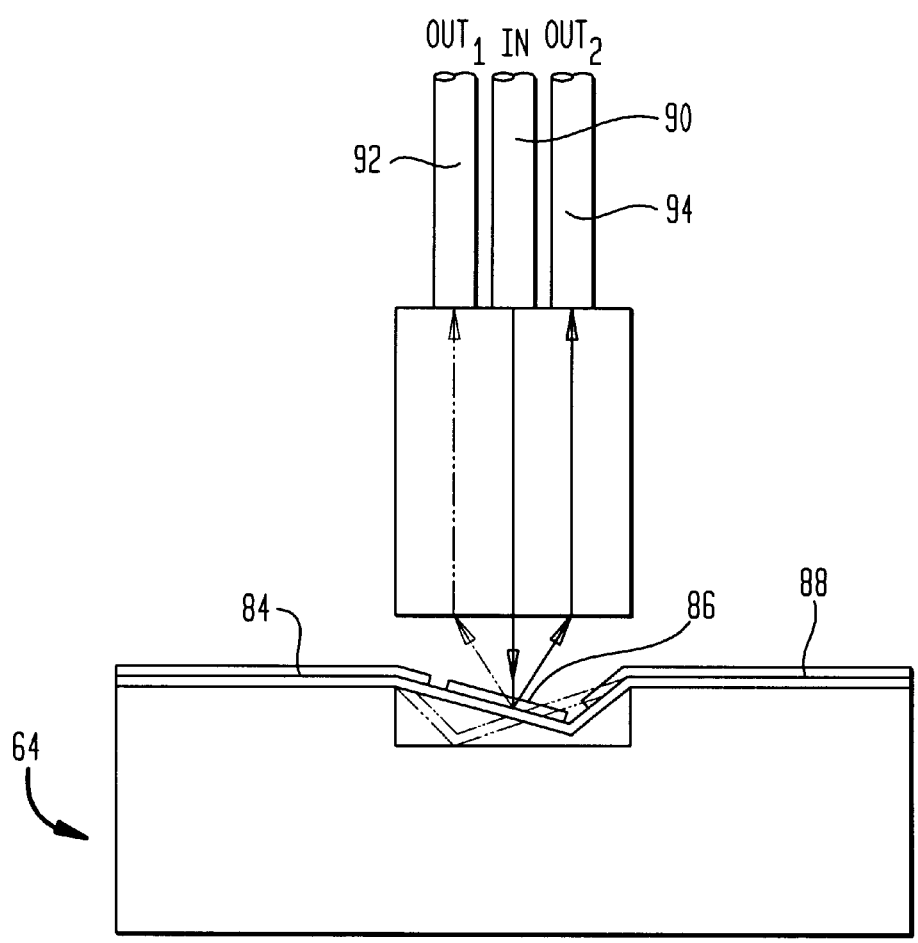
FIG. 7 is a simplified side view showing a membrane tilt-mirror switch used as a 1×2 switch.

FIGS. 6A and 6B show an illustrative optic device that may be utilized for each of the optic devices 64 (FIG. 5). The illustrated optic device is known as a membrane tilt-mirror switch. Such a device is disclosed, for example, in U.S. patent application Ser. No. 09/271,577, filed Mar. 28, 1999, now U.S. Pat. No. 6,178,033 and assigned to the assignee of the present invention. The device 64 includes a substrate 78 which is grounded and is formed with a cavity 80. A flexible membrane 82 extends across the cavity 80 and has deposited thereon three areas of gold 84, 86, 88. The outer areas 84, 86 are used as electrodes and the central area 86 is used as a mirror. Depending upon the voltages applied to the electrodes 84, 88, the central mirror 86 is caused to tilt either one way or the other. When used with an input optical fiber and one output optical fiber as an add/drop switch, a voltage is selectively applied to only the electrode 84. FIG. 7 schematically depicts the use of such an optic device as a 1×2 switch where there is one input optical fiber 90 and two output optical fibers 92, 94. In this case, voltages are selectively applied to either of the electrodes 84, 88 to tilt the mirror 86 either one way or the other so that the beam from the input fiber 90 is directed to a selected one of the output fibers 92, 94.

Accordingly, there has been disclosed an improved collimated-beam photonics package which minimizes the required active alignment. While illustrative embodiments of the present invention have been disclosed herein, it will be appreciated by those skilled in the art that various adaptations and modifications to the disclosed embodiments are possible and it is intended that this invention be limited only by the scope of the appended claims.

What is claimed is:

1. A collimated-beam photonics package comprising:
   a plurality of optical fibers;
   a plurality of imaging devices;
   a first holder arranged to hold end segments of the plurality of optical fibers in a parallel spaced array, and to hold the plurality of imaging devices with one or more optical fibers in alignment with each of the plurality of imaging devices;
   a plurality of membrane tilt-mirror switches; and
   a second holder arranged to hold said plurality of membrane tilt-mirror switches in a spaced array corresponding to the parallel spaced array of the plurality of optical fibers;
   wherein the first and second holders are formed with complementary exterior features so that the first and second holders are securable one to the other with each imaging device in optical communication with a respective membrane tilt-mirror switch.

2. The package according to claim 1 wherein the first holder holds the optical fiber end segments in a linear array.

3. The package according to claim 2 wherein the first holder comprises at least one silicon V-groove array.

4. The package according to claim 1 wherein:
   the second holder comprises a substrate having a planar surface on which are mounted the plurality of membrane tilt-mirror switches; and
   the complementary exterior features are arranged so that when the first and second holders are secured together the planar surface of the second holder substrate is orthogonal to the optical fiber end segments held in the first holder.

5. The package according to claim 4 wherein:
   each of the membrane tilt-mirror switches has an active surface lying substantially in a device plane parallel to the planar surface of the second holder substrate; and
   the complementary exterior features includes:
   a plurality of pedestals extending from the planar surface of the second holder substrate to a pedestal plane above the device plane; and
   a planar surface orthogonal to the optical fiber end segments at the forward mating end of the first holder;
   whereby the forward mating end of the first holder is held a predetermined distance from the plurality of membrane tilt-mirror switches by abutting the first holder forward mating end planar surface against the pedestal plane.

6. The package according to claim 5 wherein the complementary exterior features further include:
   a defined peripheral configuration at the forward mating end of the first holder surrounding the forward mating end planar surface; and
   a block extending from the planar surface of the second holder above the pedestal plane and having a lateral surface configured complemental to the defined peripheral configuration of the first holder;
   whereby the block aligns the first holder with each imaging device in optical communication with the respective membrane tilt-mirror switch.

7. A collimated-beam photonics package comprising:
   a plurality of optical fibers;
   a plurality of imaging devices;
   a first holder arranged to hold end segments of the plurality of optical fibers in a parallel spaced array, and to hold the plurality of imaging devices with one or more optical fibers in alignment with each of the plurality of imaging devices, wherein the plurality of imaging devices are exposed at a forward mating end of the first holder and wherein the first holder is formed with a first complementary exterior feature including a defined peripheral exterior configuration surrounding the forward mating end;
   a plural city of surface-normal optic devices; and
   a second holder arranged to hold said plurality of optic devices in a spaced array corresponding to the parallel spaced array of the plurality of optical fibers, wherein the second holder is formed with a second complementary exterior feature including a block having a lateral surface configured complemental to the defined peripheral configuration of the first holder;

whereby the respective complementary exterior features of the first and second holders are formed so that the first and second holders are securable one to the other with each imaging device in optical communication with a respective optic device.

8. The package according to claim 7 wherein the first holder holds the optical fiber end segments in a linear array.

9. The package according to claim 8 wherein the first holder comprises at least one silicon V-groove array.

10. The package according to claim 7 wherein:

the second holder comprises a substrate having a planar surface on which are mounted the plurality of optic devices; and the complementary exterior features are arranged so that when the first and second holders are secured together the planar surface of the second holder substrate is orthogonal to the optical fiber end segments held in the first holder.

11. The package according to claim 10 wherein:

each of the optic devices has an active surface lying substantially in a device plane parallel to the planar surface of the second holder substrate; and the complementary exterior features further include:

a plurality of pedestals extending from the planar surface of the second holder substrate to a pedestal plane above the device plane; and a planar surface orthogonal to the optical fiber end segments at the forward mating end of the first holder;

whereby the forward mating end of the first holder is held a predetermined distance from the plurality of optic devices by abutting the first holder forward mating end planar surface against the pedestal plane.

12. The package according to claim 7 wherein each of the plurality of optic devices comprises a membrane tilt-mirror switch.

* * * * *